United States Patent
Yamanaka et al.

(10) Patent No.: US 11,613,251 B2
(45) Date of Patent: Mar. 28, 2023

(54) PARKING ASSIST SYSTEM

(71) Applicant: HONDA MOTOR CO., LTD., Tokyo (JP)

(72) Inventors: Hiroshi Yamanaka, Saitama (JP); Masaaki Kawano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 16/953,526

(22) Filed: Nov. 20, 2020

(65) Prior Publication Data

US 2021/0179072 A1   Jun. 17, 2021

(30) Foreign Application Priority Data

Dec. 13, 2019 (JP) .............................. JP2019-225942

(51) Int. Cl.
*B60W 30/06* (2006.01)
*B60W 50/14* (2020.01)

(52) U.S. Cl.
CPC ............ *B60W 30/06* (2013.01); *B60W 50/14* (2013.01); *B60W 2050/146* (2013.01); *B60W 2420/42* (2013.01); *B60W 2420/54* (2013.01); *B60W 2554/806* (2020.02)

(58) Field of Classification Search
CPC ................. B60W 30/06; B60W 50/14; B60W 2050/146; B60W 2420/42; B60W 2420/54; B60W 2554/806; B62D 15/0285; B62D 15/0295; B62D 15/029; B62D 15/027
See application file for complete search history.

(56) References Cited

U.S. PATENT DOCUMENTS 10,308,283 B2    6/2019  Inagaki
2020/0086793 A1*  3/2020  Watanabe .............. H04N 5/272

FOREIGN PATENT DOCUMENTS

| JP | 2015074260 A | * | 4/2015 |
| JP | 2015074260 A |   | 4/2015 |
| JP | 5900683 B2   |   | 4/2016 |
| JP | 2018122757 A |   | 8/2018 |

(Continued)

OTHER PUBLICATIONS

JP-2015074260-A translation (Year: 2015).*

(Continued)

*Primary Examiner* — Robert T Nguyen
*Assistant Examiner* — Renee LaRose
(74) *Attorney, Agent, or Firm* — Armstrong Teasdale LLP

(57) ABSTRACT

A parking assist system includes: an imaging device configured to capture an image of a surrounding of a vehicle; a display device configured to display a surrounding image of the vehicle based on the image captured by the imaging device; and a control device configured to control a display of the display device based on the surrounding image and to calculate a trajectory of the vehicle from a current position to a target position. In a case where the trajectory includes a switching position for steering the vehicle and changing a moving direction thereof and the vehicle is moving toward the switching position, the control device causes the display device to superimpose the switching position on the surrounding image and to hide at least a first part of the trajectory, the first part connecting the switching position and the target position.

3 Claims, 8 Drawing Sheets

(56) References Cited

FOREIGN PATENT DOCUMENTS

JP  2019189134 A  * 10/2019
JP  2019189134 A    10/2019

OTHER PUBLICATIONS

JP-2015074260-A Figures (Year: 2015).*
JP-2019189134-A transl (Year: 2019).*
JP-2019189134-A Figures (Year: 2019).*
Notice of Reasons for Refusal for Patent Application JP 2019225942 dated Aug. 10, 2021; 10 pp.

* cited by examiner

PARKING ASSIST SYSTEM

TECHNICAL FIELD

The present invention relates to a parking assist system configured to autonomously move a vehicle so as to park and/or unpark the vehicle.

BACKGROUND ART

A parking assist device known in the art is mounted on a vehicle such as an automobile (for example, JP2018-122757A). This parking assist device causes a display device to display a look-down image around the vehicle to assist a driver in parking or unparking the vehicle. In an assist mode for forward parking (namely, a parking process by moving the vehicle forward) or backward unparking (namely, an unparking process by moving the vehicle backward), the above parking assist device generates the look-down image around the vehicle viewed from above based on a captured image around the vehicle. Further, the above parking assist device causes the display device to superimpose a target frame (namely, a frame indicating a target for the movement of the vehicle) on the look-down image.

A driving assist device known in the art shows an unparking route when a vehicle, which has been parked by "head in parking", is unparked (for example, Japanese Patent No. 5900683). This driving assist device determines a switching point for switching the moving direction of the vehicle, a travel trajectory from a parking position to the switching point, and a travel trajectory from the switching point to a target point.

In a parking assist system configured to autonomously move a vehicle so as to park and/or unpark the vehicle, the occupant is required to monitor the surroundings of the vehicle when the vehicle travels. In a case where a switching position for switching the moving direction of the vehicle is set in a travel route of the vehicle, the occupant cannot easily anticipate the moving direction of the vehicle only by a target frame displayed on a display device. On the other hand, if the entire travel route of the vehicle is displayed on the display device, the displayed travel route becomes too complicated for the occupant to easily recognize the moving direction of the vehicle, which may make it difficult for the occupant to monitor the surroundings of the vehicle.

SUMMARY OF THE INVENTION

In view of such a problem of the prior art, a primary object of the present invention is to make it easy for the occupant to recognize the moving direction of the vehicle and to concentrate on monitoring the surroundings of the vehicle, in a parking assist system configured to autonomously move the vehicle so as to park and/or unpark the vehicle.

To achieve such an object, one embodiment of the present invention provides a parking assist system (1) configured to autonomously move a vehicle from a current position to a target position, the parking assist system including: an imaging device (19) configured to capture an image of a surrounding of the vehicle; a display device (32) configured to display a surrounding image of the vehicle based on the image captured by the imaging device; and a control device (15) configured to control a display of the display device based on the surrounding image and to calculate a trajectory of the vehicle from the current position to the target position, wherein in a case where the trajectory includes a switching position for steering the vehicle and changing a moving direction thereof and the vehicle is moving toward the switching position, the control device causes the display device to superimpose the switching position on the surrounding image and to hide at least a first part of the trajectory, the first part connecting the switching position and the target position.

According to this configuration, the display device superimposes the switching position on the surrounding image. Further, the display device hides at least a first part (a part connecting the switching position and the target position) of the trajectory, so that the display of the display device can be simplified. Accordingly, the attention of the occupant can be concentrated on the trajectory to the switching position, so that the occupant can easily recognize the moving direction of the vehicle, and thus can concentrate on monitoring the surroundings of the vehicle.

To achieve the above object, another embodiment of the present invention provides a parking assist system configured to autonomously move a vehicle from a current position to a target position, the parking assist system including: an imaging device configured to capture an image of a surrounding of the vehicle; a display device configured to display a surrounding image of the vehicle based on the image captured by the imaging device; and a control device configured to control a display of the display device based on the surrounding image and to calculate a trajectory of the vehicle from the current position to the target position, wherein in a case where the trajectory includes a switching position for steering the vehicle and changing a moving direction thereof and the vehicle is moving toward the switching position, the control device causes the display device to superimpose the switching position and the target position on the surrounding image, and then causes the display device to hide the target position when the switching position and the target position can be simultaneously displayed on the display device and a prescribed non-display condition is satisfied.

According to this configuration, when the switching position and the target position can be simultaneously displayed on the display device and the non-display condition is satisfied, the target position is hidden. Accordingly, the attention of the occupant can be concentrated on the switching position, so that the occupant can effectively monitor the surroundings of the vehicle.

In the above configuration, preferably, in the case where the trajectory includes the switching position and the vehicle is moving toward the switching position, the control device causes the display device to superimpose the switching position and a second part of the trajectory on the surrounding image, the second part connecting the current position and the switching position.

According to this configuration, the display device displays the switching position and the trajectory thereto. Accordingly, the occupant can easily recognize the travel route of the vehicle from the current position to the switching position, and thus can easily monitor the surroundings of the vehicle.

In the above configuration, preferably, in the case where the trajectory includes the switching position and the vehicle is moving toward the switching position, the control device causes the display device to superimpose the switching position, a part connecting a starting point and an ending point of the trajectory, and the target position on the surrounding image and to hide at least the first part of the trajectory, and then causes the display device to stop displaying the target position when a prescribed non-display condition is satisfied.

According to this configuration, when the occupant should concentrate on monitoring the surroundings of the vehicle, the display device stops displaying the target position, so that the display of the display device can be simplified. Accordingly, the occupant can easily concentrate on monitoring the surroundings of the vehicle.

In the above configuration, preferably, the non-display condition includes a condition that the vehicle parked between two vehicles aligned in a fore and aft direction of the vehicle moves forward so as to be unparked.

According to this configuration, when some risk may be caused by the movement of the vehicle, the attention of the occupant can be concentrated on the surroundings of the switching position for which the vehicle is heading. Accordingly, the safety of the vehicle can be enhanced.

In the above configuration, preferably, in the case where the trajectory includes the switching position and the vehicle is moving toward the switching position, the control device causes the display device to superimpose the switching position and a part connecting a starting point and an ending point of the trajectory on the surrounding image, and then causes the display device to further superimpose the target position on the surrounding image when a prescribed display condition is satisfied.

According to this configuration, when the display condition is satisfied, the display device displays the target position for which the vehicle is heading by the autonomous movement. Accordingly, the occupant can easily recognize the target position for which the vehicle is heading, so that the anxiety of the occupant caused by the autonomous movement of the vehicle can be reduced.

In the above configuration, preferably, the display condition includes at least one of a first condition and a second condition, the first condition being a condition that the vehicle moves backward so as to be parked, the second condition being a condition that the vehicle parked between two vehicles aligned in a lateral direction of the vehicle moves forward so as to be unparked.

According to this configuration, when the vehicle is parked, the occupant can recognize the parking position. Further, when the vehicle which has been parked by perpendicular parking is unparked, the occupant can understand the unparking direction thereof. Accordingly, the occupant can easily recognize the target position for which the vehicle is heading, so that the anxiety of the occupant caused by the autonomous movement of the vehicle can be reduced.

Thus, according to the above configurations, in a parking assist system configured to autonomously move the vehicle so as to park and/or unpark the vehicle, it is possible to make it easy for the occupant to recognize the moving direction of the vehicle and to concentrate on monitoring the surroundings of the vehicle.

BRIEF DESCRIPTION OF THE DRAWING(S)

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
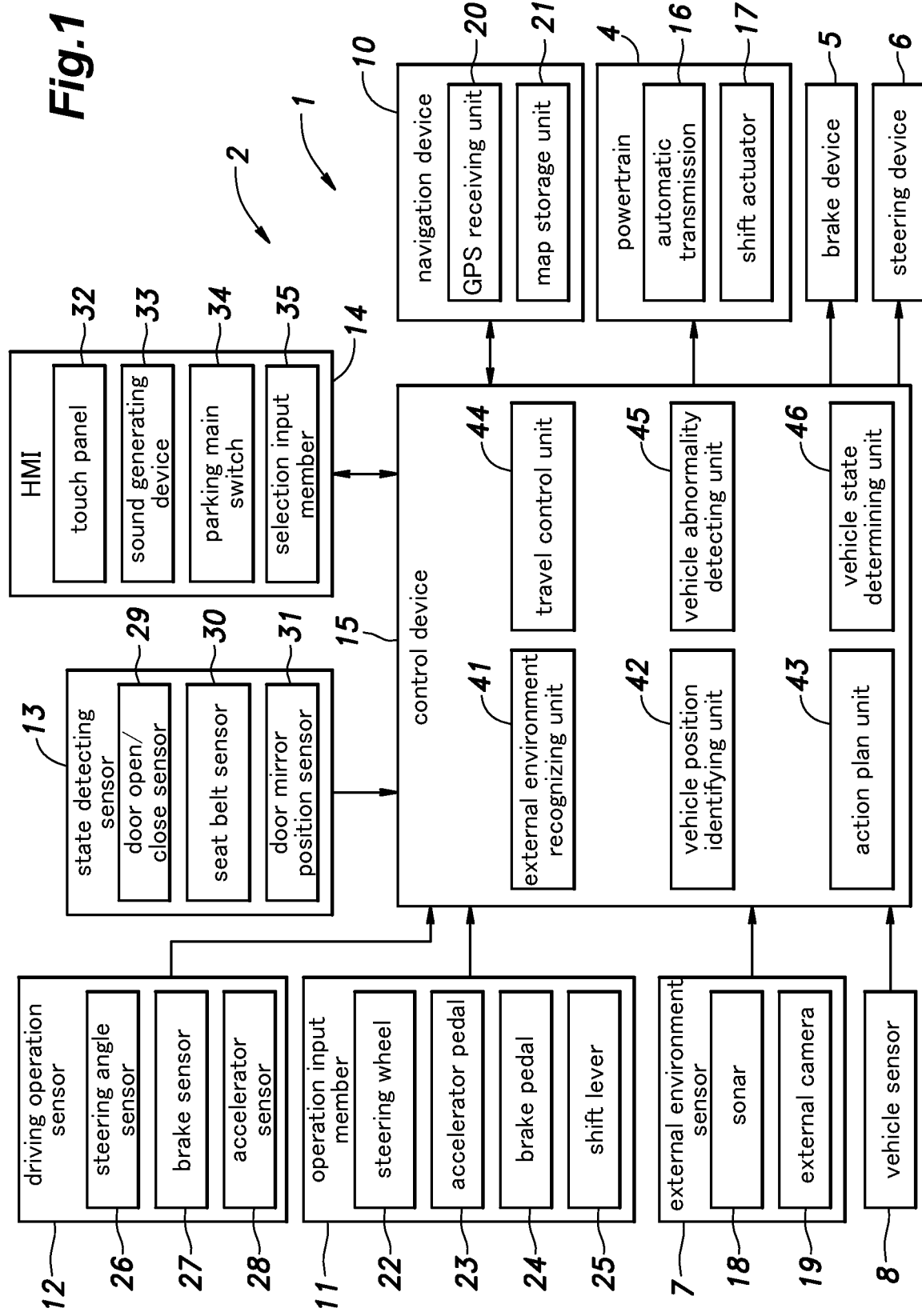
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The control device 15 is configured to control the display of the touch panel 32 based on a surrounding image of the vehicle. For example, when the vehicle is traveling, the control device 15 can cause the touch panel 32 to display the look-down image and the bird's-eye image, which are generated based on the image captured by the external cameras 19.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the external cameras 19 (an example of an imaging device configured to capture an image of a surrounding of the vehicle), the touch panel 32 (an example of a display device), and the control device 15.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

<The Automatic Parking Process>

Figure 2:
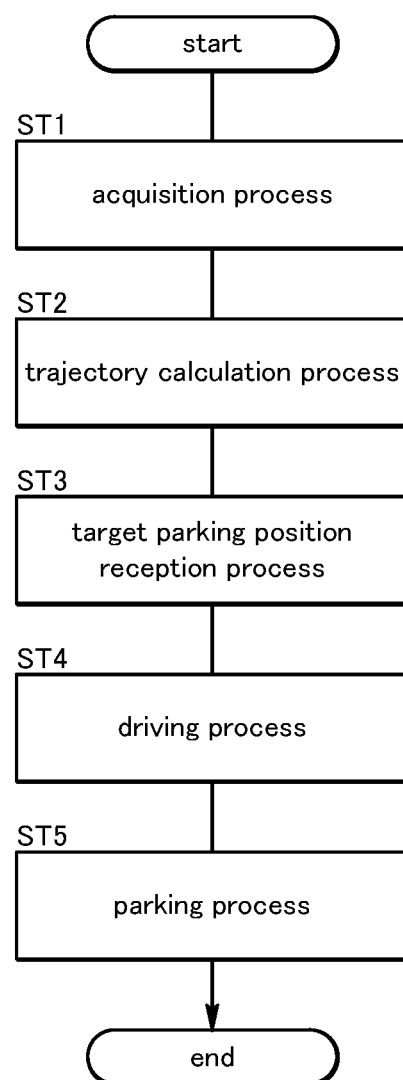
FIG. 2 is a flowchart of an automatic parking process in the parking assist system according to the embodiment.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

In the trajectory calculation process, the action plan unit 43 calculates a trajectory (parking trajectory) to lead the vehicle from the current position to the parking space by moving the vehicle only backward while steering the vehicle in the lateral direction (namely, while turning the vehicle to the left or right). In a case where the action plan unit 43 cannot calculate such a trajectory to lead the vehicle to the parking space by moving the vehicle only backward, the action plan unit 43 calculates a trajectory to move the vehicle forward and backward once or repeatedly. In the present embodiment, the action plan unit 43 calculates a trajectory to move the vehicle forward and backward once. More specifically, the action plan unit 43 calculates a trajectory to move the vehicle as follows. First, the vehicle moves backward and then stops at a prescribed rear switching position. Then, the steering angle of the wheels is changed at the rear switching position. Thereafter, the vehicle moves forward and then stops at a prescribed front switching position. Then, the steering angle of the wheels is changed at the front switching position. Thereafter, the vehicle moves backward and then reaches the parking space. In the following, for convenience of explanation, the front switching position and the rear switching position are sometimes collectively referred to as "the switching position".

Here, the above trajectory means a group of positions through which the vehicle should pass. The above trajectory includes a starting point and an ending point thereof. Further, the above switching position means a position on the trajectory for steering (turning) the vehicle and changing the travel direction (moving direction) thereof. In the present specification, a part connecting one part and the other part of the trajectory from the one part to the other part means a part excluding the one part and the other part of the trajectory from the one part to the other part. Namely, in the present specification, a part connecting one part and the other part does not include the one part and the other part.

Further, a forward trajectory indicates a group of positions through which the vehicle passes when moving forward, and a backward trajectory indicates a group of positions through which the vehicle passes when moving backward. The forward trajectory and the backward trajectory each include a stop position (the switching position or the target position) of the vehicle.

In a case where the action plan unit 43 cannot calculate the trajectory to lead the vehicle to the parking space by moving the vehicle forward and backward once, the action plan unit 43 determines that the trajectory of the vehicle cannot be calculated. In such a case, the action plan unit 43 does not set the parking space as the parking position candidate, and does not cause the touch panel 32 to display the parking space on the screen. Further, the action plan unit 43 causes the touch panel 32 to display a message that it is difficult to execute the automatic parking, and then ends the automatic parking process.

Figure 3A:
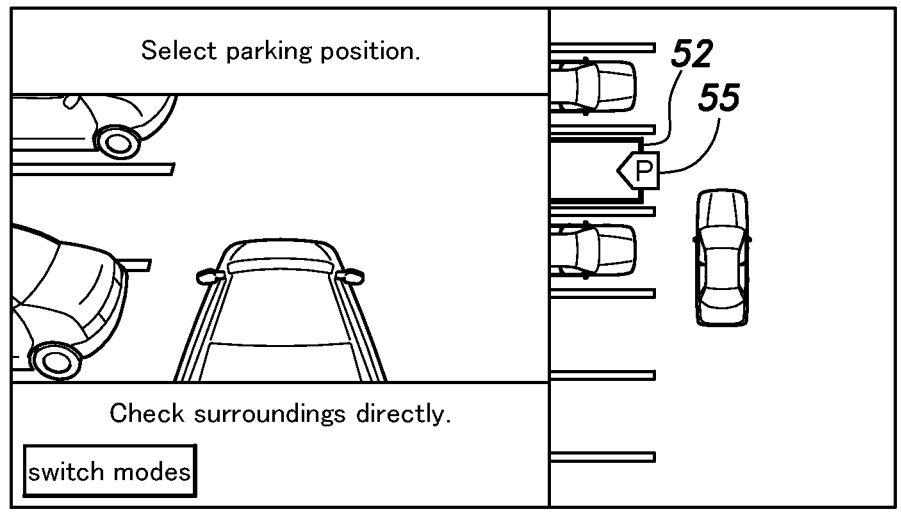
FIG. 3A is a diagram showing a screen display of a touch panel during a target parking position reception process in the parking assist system according to the embodiment.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
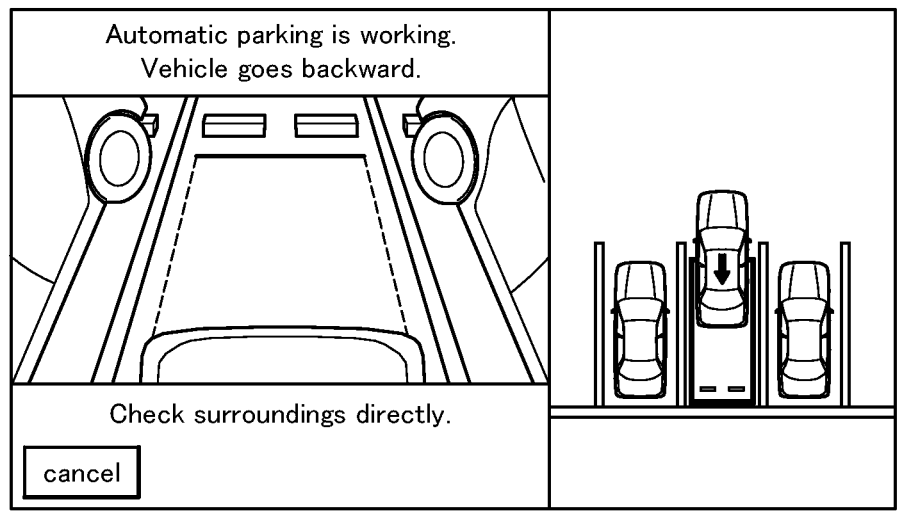
FIG. 3B is a diagram showing the screen display of the touch panel during a driving process in the parking assist system according to the embodiment.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to cause the vehicle to travel along the calculated trajectory.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

When the vehicle state determining unit 46 determines that the vehicle is in the prohibition state during the driving process, the action plan unit 43 displays a notification that the automatic parking is suspended or canceled on the touch panel 32 and executes a deceleration process to decelerate the vehicle to stop the same. Thus, when there is a predetermined operation input by the occupant via the operation input member 11, the action plan unit 43 executes the deceleration process, whereby uneasiness that would be felt by the occupant if the movement of the vehicle were continued can be avoided.

Figure 3C:
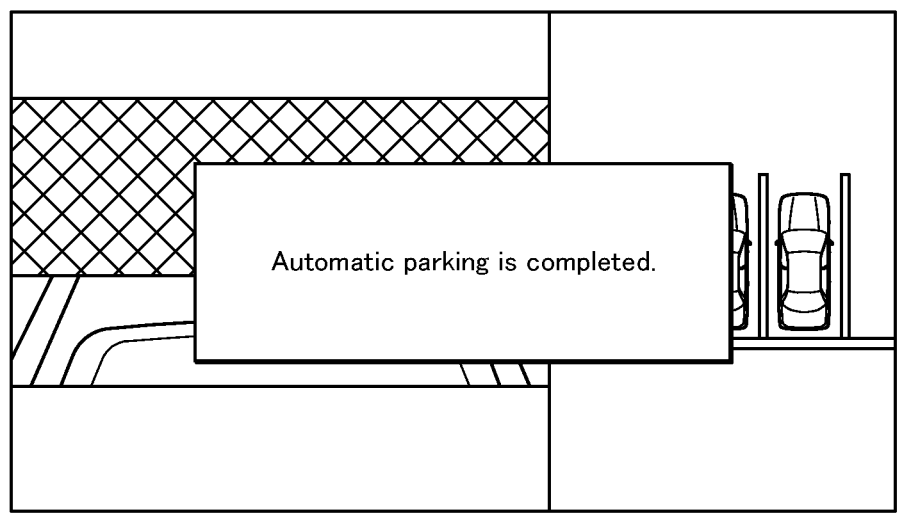
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Next, the screen display of the touch panel 32 in the automatic parking process will be described in detail. As described with reference to FIG. 3A, the action plan unit 43 is configured to be capable of performing image processing to convert the surrounding image captured by the external cameras 19 into the look-down image and the bird's-eye image. Thereby, the parking position candidates and the target parking position are displayed to be easily recognized by the occupant. Further, as described with reference to FIG. 3B, in the parking screen, the action plan unit 43 displays the look-down image and the travel direction image side by side on the touch panel 32. Thereby, the occupant can confirm the travel direction on the screen and check the progress of the autonomous movement operation in the automatic parking process in the look-down image.

Here, the look-down image is an image of the vehicle and its surroundings viewed from above. The look-down image is displayed with the front of the vehicle facing upward on the screen, and an image representing the vehicle is composited in the center of the surrounding image. The bird's-eye image is an image of the vehicle and a part of the surrounding area of the vehicle positioned in the travel direction as viewed downward in the travel direction from a view point above the vehicle and shifted in the direction opposite to the travel direction. The bird's-eye image is displayed so that the travel direction of the vehicle coincides with the upward direction of the screen, and an image representing the vehicle is composited at the bottom of the (partial) surrounding image. When the vehicle is moving forward, the bird's-eye image is an image of the vehicle and an area in front of the vehicle as viewed downward in the forward direction from a view point above and rear of the vehicle. When the vehicle is moving backward, the bird's-eye image is an image of the vehicle and an area to the rear of the vehicle as viewed downward in the rear direction from a view point above and front of vehicle. It should be noted that the determination as to whether the vehicle is moving forward or backward may be made based on the vehicle speed or the shift range. The bird's-eye image when the vehicle is stopped or in the parking range may be an image of the vehicle and the front area as viewed forward and downward as in the same manner as when the vehicle is moving forward.

When the vehicle is moving forward, namely, when the vehicle is traveling along the forward trajectory, the action plan unit 43 causes the left half of the touch panel 32 to display a front image (front view), which is the surrounding image (the bird's-eye image) of the front of the vehicle captured by the external cameras 19. At this time, the action plan unit 43 causes the touch panel 32 to superimpose an indicating line and a connecting part on the front image. The indicating line indicates an ending position of the forward trajectory where the vehicle is traveling. The connecting part is included in the trajectory from the current position of the vehicle to the ending position of the forward trajectory, and connects the current position of the vehicle and the ending position of the forward trajectory.

Figure 4A:
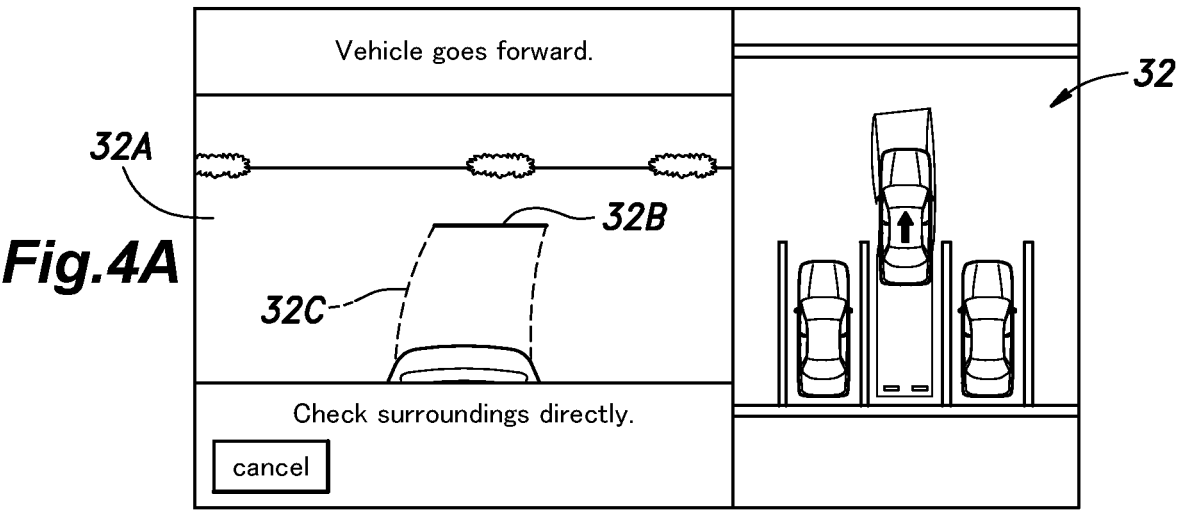
FIG. 4A is a diagram showing the screen display of the touch panel when the vehicle is moving forward in the automatic parking process.

More specifically, in the present embodiment, as shown in FIG. 4A, when the vehicle is moving forward from the rear switching position to the front switching position, the action plan unit 43 causes the left half of the touch panel 32 to superimpose an indicating line 32B (shown by a thick line) and a connecting part 32C (shown by broken lines) on a front image 32A. The indicating line 32B indicates the front switching position. The connecting part 32C is included in the trajectory from the current position of the vehicle to the front switching position, and connects the current position of the vehicle and the front switching position.

When the vehicle is moving backward, namely, when the vehicle is traveling along the backward trajectory, the action plan unit 43 causes the left half of the touch panel 32 to display a rear image (rear view), which is the surrounding image (the bird's-eye image) of the rear of the vehicle captured by the external cameras 19. At this time, the action plan unit 43 causes the touch panel 32 to superimpose an indicating line, a connecting part, and a target position frame on the rear image. The indicating line indicates an ending position of the backward trajectory where the vehicle is traveling. The connecting part is included in the trajectory from the current position of the vehicle to the ending position of the backward trajectory, and connects the current position of the vehicle and the ending position of the backward trajectory. The target position frame indicates the target parking position. In a case where the indicating line and the target position frame overlap with each other, the action plan unit 43 may cause the touch panel 32 to display both of them so as to overlap with each other, or to display only one of them in a part where both of them overlap with each other.

Figure 4B:
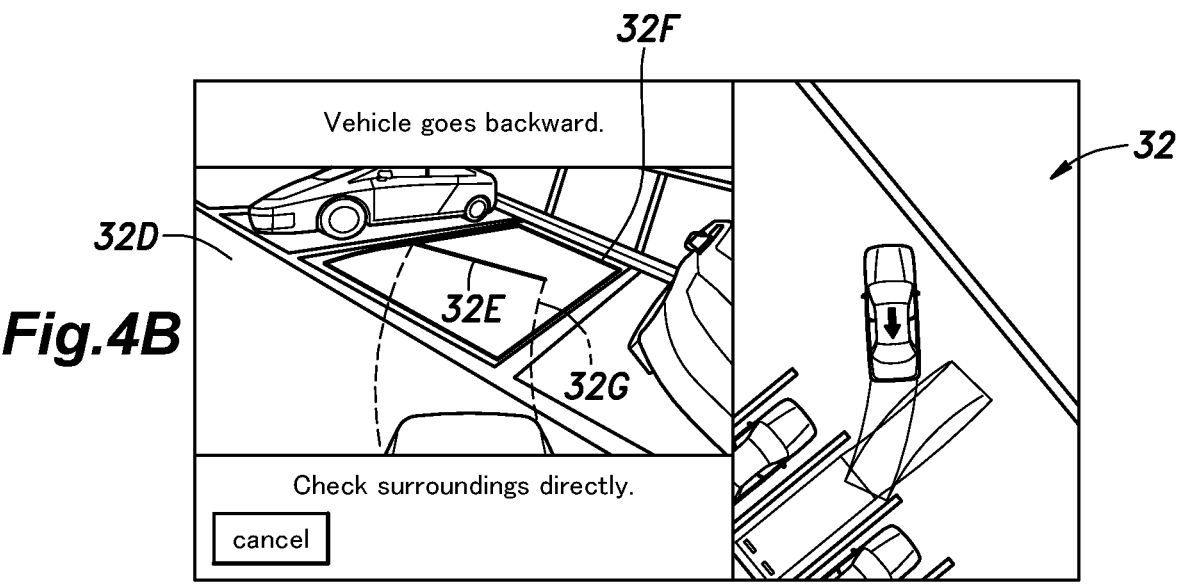
FIG. 4B is a diagram showing the screen display of the touch panel when the vehicle is moving backward in the automatic parking process.

More specifically, in the present embodiment, as shown in FIG. 4B, when the vehicle is moving backward from the starting point of the automatic parking process to the rear switching position, the action plan unit 43 causes the left half of the touch panel 32 to superimpose an indicating line 32E (shown by a thick line), a connecting part 32G (shown by broken lines), and a target position frame 32F (shown by a thick line) on the rear image 32D. The indicating line 32E indicates the rear switching position. The connecting part 32G is included in the trajectory from the current position of the vehicle to the rear switching position, and connects the current position of the vehicle and the rear switching position. The target position frame 32F indicates the target parking position. When the vehicle is moving backward from the front switching position to the target parking position, the action plan unit 43 causes the left half of the touch panel 32 to superimpose a target position frame, an indicating line, and a connecting part on the rear image. The target position frame indicates the target parking position. The indicating line also indicates the target parking position. The connecting part is included in the trajectory from the current position of the vehicle to the target parking position, and connects the current position of the vehicle and the target parking position.

Further, during the driving process, in any of a case where the vehicle is moving forward, a case where the vehicle is moving backward, and a case where the vehicle is stopped, the action plan unit 43 causes the right half of the touch panel 32 to superimpose the current position of the vehicle and the trajectory from the current position of the vehicle to the target parking position in the look-down image. Further, the action plan unit 43 may cause the touch panel 32 to superimpose an arrow indicating the travel direction of the vehicle on an image of the own vehicle shown in the look-down image. Thereby, the target parking position and the trajectory thereto are displayed to be easily recognized by the occupant, so that the occupant can confirm the travel direction and the trajectory on the screen and check the progress of the autonomous movement of the vehicle on the screen.

<Automatic Parallel Unparking Process>

Figure 5:
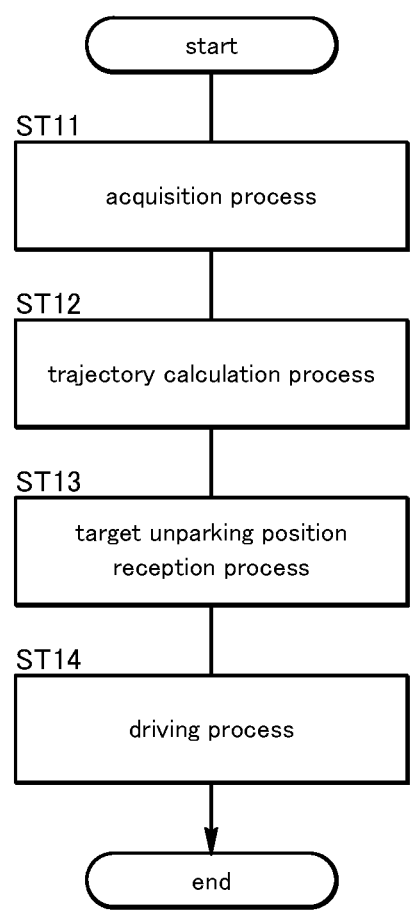
FIG. 5 is a flowchart of an automatic parallel unparking process.

Next, with reference to FIG. 5, an automatic parallel unparking process executed by the action plan unit 43 will be described. For example, the automatic parallel unparking process is executed when the parking main switch 34 receives an input in a state where the vehicle is parked between two other vehicles aligned in the fore and aft direction of the vehicle. Namely, the automatic parallel unparking process is executed when the vehicle is parked in a parallel parking position where the travel direction (the fore and aft direction) of the vehicle extends along the passage.

The action plan unit 43 first performs an acquisition process (step ST11) to acquire an unparking space 61 (see FIG. 6A) from the external environment recognizing unit 41. More specifically, based on the signal from the external environment sensor 7, the external environment recognizing unit 41 detects the position and size of any obstacle around the own vehicle and also detects a space having a sufficient size for the own vehicle to move to on left and right sides of the vehicle (hereinafter referred to as "front vehicle") located in front of the own vehicle. The action plan unit 43 acquires the information detected by the external environment recognizing unit 41. In a case where it is determined that there is a sufficient space on each of the left and right sides of the front vehicle (namely, on the front of the left and right sides of the own vehicle), the action plan unit 43 sets an unparking space 61 on each of the left and right sides of the front vehicle. If it is determined that there is a sufficient space on only one of the left and right sides of the front vehicle, the action plan unit 43 sets an unparking space 61 only on the one of the left and right sides of the front vehicle where there is a sufficient space. If it is determined that there is no sufficient space on either of the left and right sides of the front vehicle, the action plan unit 43 displays a message notifying the absence of the sufficient space on the touch panel 32, and terminates the automatic parallel unparking process.

Next, the action plan unit 43 performs a trajectory calculation process (ST12) to calculate a trajectory (a parallel unparking trajectory) for unparking the vehicle from the current position to each unparking space 61 based on the positions of other vehicles around the own vehicle acquired from the external environment recognizing unit 41.

More specifically, in the trajectory calculation process, the action plan unit 43 calculates a trajectory to lead the vehicle from the current position to each unparking space 61 by moving the vehicle only forward while steering the vehicle in the lateral direction (namely, while turning the vehicle to the left or right). In a case where the action plan unit 43 cannot calculate such a trajectory to lead the vehicle to each unparking space 61 by moving the vehicle only forward, the action plan unit 43 calculates a trajectory to move the vehicle forward and backward once or repeatedly. In the present embodiment, the action plan unit 43 calculates a trajectory to move the vehicle backward, forward, backward, and forward in this order. More specifically, the action plan unit 43 calculates a trajectory to move the vehicle as follows. First, the vehicle moves backward to a prescribed first rear switching position, and then the steering angle of the wheels is changed thereat. Thereafter, the vehicle moves forward to a prescribed front switching position, and then the steering angle of the wheels is changed thereat. Thereafter, the vehicle moves backward to a prescribed second rear switching position. Thereafter, the vehicle moves forward and then reaches the unparking space 61.

In a case where the trajectory of the vehicle for a certain unparking space 61 can be calculated, the action plan unit 43 sets the unparking space 61 as an unparking position candidate where the vehicle can be unparked, and make the touch panel 32 display the unparking position candidate on the screen (the unparking search screen). When the trajectory can be calculated for both of the unparking spaces 61 on the left and right sides of the front vehicle, the action plan unit 43 sets both of the unparking spaces 61 as unparking position candidates and make them displayed on the touch panel 32. If the trajectory from the current position to any unparking space 61 cannot be calculated due to the presence of the obstacle, the action plan unit 43 preferably displays a message notifying it on the touch panel 32 and terminates the automatic unparking process.

Figure 6A:
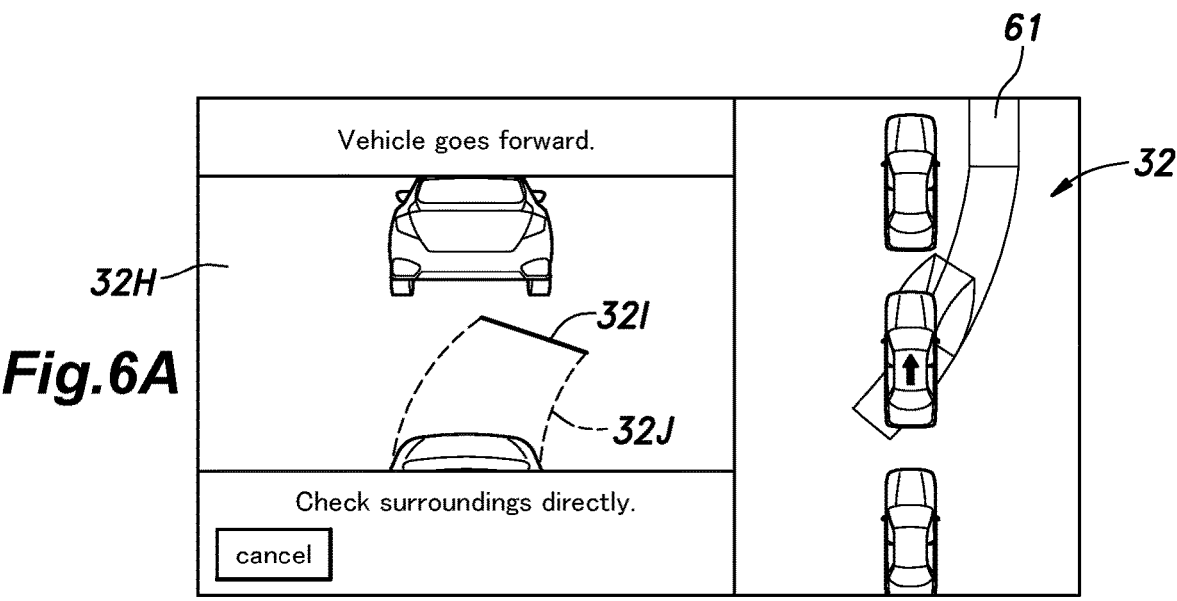
FIG. 6A is a diagram showing the screen display of the touch panel when the vehicle is moving forward in the automatic parallel unparking process.
Figure 6B:
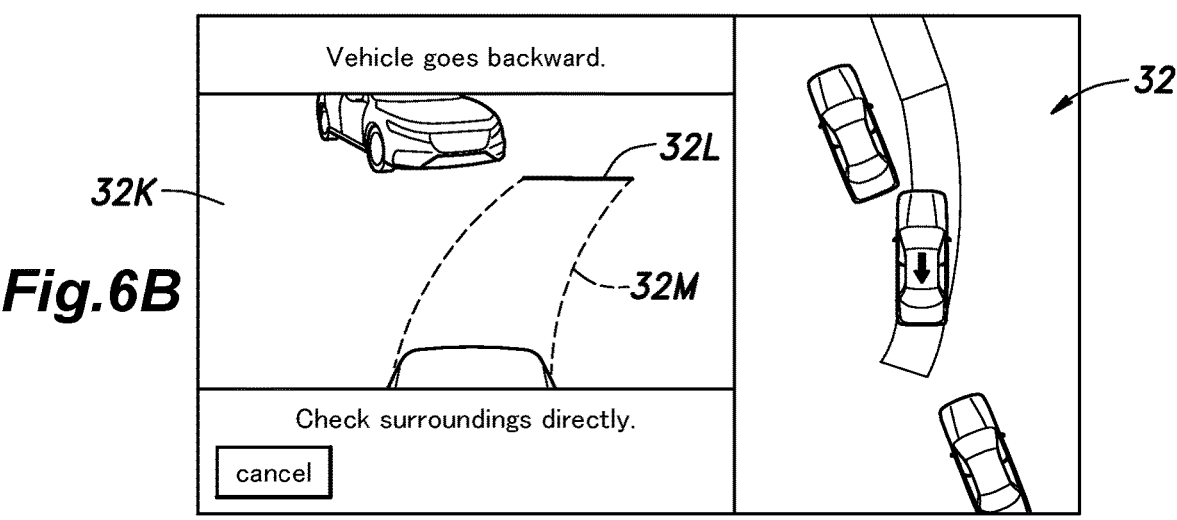
FIG. 6B is a diagram showing the screen display of the touch panel when the vehicle is moving backward in the automatic parallel unparking process.

Next, the action plan unit 43 executes a target unparking position reception process (ST13) to receive a selection operation performed by the occupant to select the target unparking position, which is an unparking position where the occupant wants to unpark the vehicle, and is selected from the unparking position candidates displayed on the touch panel 32. More specifically, the action plan unit 43 causes the look-down image and the bird's-eye image in the travel direction to be displayed in the unparking search screen. Here, the bird's-eye image in the travel direction is a bird's-eye image looking down on the vehicle in the forward direction as shown in FIG. 6A when the shift range is the parking range (parking position), the neutral range, or the drive (forward) range, and a bird's-eye image looking down on the vehicle in the rearward direction as shown in FIG. 6B when the shift range is the reverse range.

When the action plan unit 43 acquires at least one unparking position candidate, the action plan unit 43 displays an arrow indicating the direction of the trajectory to the unparking position candidate to be superimposed on the surrounding image in at least one of look-down image and the bird's-eye image. In the present embodiment, the action plan unit 43 causes an arrow indicating the direction of each trajectory to be displayed in both the look-down image and the bird's-eye image. In this way, the action plan unit 43 causes the touch panel 32 to display the direction of the trajectory to each unparking position candidate to be superimposed on the look-down image and the bird's-eye image in the unparking search screen, whereby the occupant can easily recognize the direction of the trajectory.

Also, the action plan unit 43 causes a notification instructing the driver to set the unparking position (target unparking position) to be displayed in the unparking search screen displayed on the touch panel 32 in order to receive the selection operation of the target unparking position. The selection operation of the target unparking position may be performed via the touch panel 32 or the selection input member 35.

After the target unparking position is selected by the driver, the action plan unit 43 switches the screen of the touch panel 32 from the unparking search screen to the unparking screen, and executes a driving process (ST14) to make the vehicle travel along the calculated trajectory. The action plan unit 43 preferably sets, as a condition for starting the driving process, at least one of an operation input corresponding to the start of driving, an operation of depressing the brake pedal 24, an operation of releasing the parking brake, and an operation of placing the shift lever 25 in a range suitable for the travel direction. In this case, the action plan unit 43 preferably makes a notification instructing the occupant to perform the operation set as the start condition by displaying it on the touch panel 32 or by voice guidance.

In the driving process, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 may control the powertrain 4, the brake device 5, and the steering device 6 so as to cause the vehicle to travel along the calculated trajectory.

As shown in FIG. 6A, when the vehicle is moving forward, namely, when the vehicle is traveling along the forward trajectory, the action plan unit 43 causes the left half of the touch panel 32 to superimpose an indicating line and a connecting part on the front image. The indicating line indicates an ending position of the forward trajectory where the vehicle is traveling. The connecting part is included in the trajectory from the current position of the vehicle to the ending position of the forward trajectory, and connects the current position of the vehicle and the ending position of the forward trajectory. In a case where the ending position of the forward trajectory and the target unparking position are identical to each other, the action plan unit 43 causes the touch panel 32 to display only the indicating line.

More specifically, in the present embodiment, as shown in FIG. 6A, when the vehicle is moving forward from the first rear switching position to the front switching position, the action plan unit 43 causes the left half of the touch panel 32 to superimpose an indicating line 321 (shown by a thick line) and a connecting part 32J (shown by broken lines) on the front image 32H. The indicating line 321 indicates the front switching position. The connecting part 32J is included in the trajectory from the current position of the vehicle to the front switching position, and connects the current position of the vehicle and the front switching position. When the vehicle is moving forward from the second rear switching position to the target unparking position, the action plan unit 43 causes the left half of the touch panel 32 to superimpose an indicating line and a connecting part on the front image. The indicating line indicates the target unparking position. The connecting part is included in the trajectory from the current position of the vehicle to the target unparking position, and connects the current position of the vehicle and the target unparking position.

When the vehicle is moving backward, namely, when the vehicle is traveling along the backward trajectory, the action plan unit 43 causes the left half of the touch panel 32 to superimpose an indicating line and a connecting part on the rear image. The indicating line indicates an ending position of the backward trajectory where the vehicle is traveling. The connecting part is included in the trajectory from the current position of the vehicle to the ending position of the backward trajectory, and connects the current position of the vehicle and the ending position of the backward trajectory.

More specifically, in the present embodiment, when the vehicle is moving backward from the starting point of the automatic parallel unparking process to the first rear switching position, the action plan unit 43 causes the left half of the touch panel 32 to superimpose an indicating line and a connecting part on the rear image. The indicating line indicates the first rear switching position. The connecting part is included in the trajectory from the current position of the vehicle to the first rear switching position, and connects the current position of the vehicle and the first rear switching position. As shown in FIG. 6B, when the vehicle is moving backward from the front switching position to the second rear switching position, the action plan unit 43 causes the left half of the touch panel 32 to superimpose an indicating line 32L (shown by a thick line) and a connecting part 32M (shown by broken lines) on the rear image 32K. The indicating line 32L indicates the second rear switching position. The connecting part 32M is included in the trajectory from the current position of the vehicle to the second rear switching position, and connects the current position of the vehicle and the second rear switching position.

Further, during the driving process, in any of a case where the vehicle is moving forward, a case where the vehicle is moving backward, and a case where the vehicle is stopped, the action plan unit 43 causes the right half of the touch panel 32 to superimpose the current position of the vehicle and the trajectory from the current position of the vehicle to the target unparking position on the look-down image. Further, the action plan unit 43 may cause the touch panel 32 to superimpose an arrow indicating the travel direction of the vehicle on an image of the own vehicle shown in the look-down image. Thereby, the target unparking position and the trajectory thereto are displayed to be easily recognized by the occupant, so that the occupant can confirm the travel direction and the trajectory on the screen and check the progress of the autonomous movement of the vehicle on the screen.

When the vehicle state determining unit 46 determines that the vehicle is in the prohibition state during the driving process, the action plan unit 43 displays a notification that the automatic unparking is suspended or canceled on the touch panel 32 and executes a deceleration process to decelerate the vehicle to stop the same. Thus, when there is a predetermined operation input by the occupant via the operation input member 11, the action plan unit 43 executes the deceleration process, whereby uneasiness that would be felt by the occupant if the movement of the vehicle were continued can be avoided.

When the vehicle reaches the target unparking position, the action plan unit 43 stops the vehicle and ends the driving process.

<Automatic Perpendicular Unparking Process>

Figure 7:
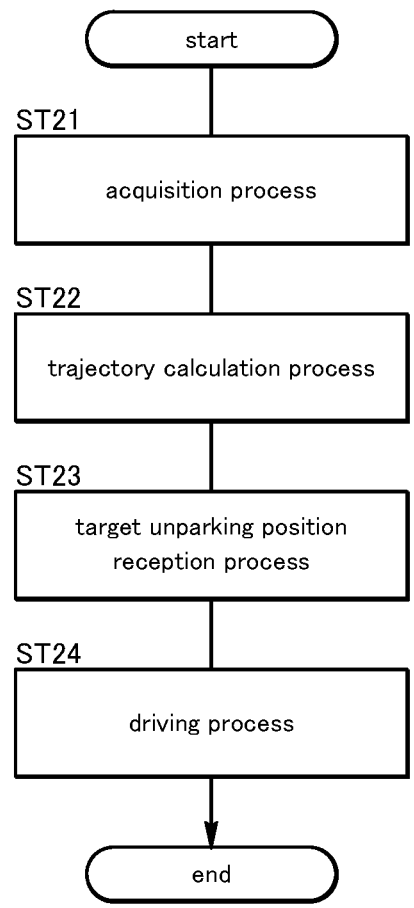
FIG. 7 is a flowchart of an automatic perpendicular unparking process.

Next, with reference to FIG. 7, an automatic perpendicular unparking process executed by the action plan unit 43 will be described. For example, the automatic perpendicular unparking process is executed when the parking main switch 34 receives an input in a state where the vehicle is parked between two other vehicles aligned in the lateral direction of the vehicle. Namely, the automatic perpendicular unparking process is executed when the vehicle is parked in a perpendicular parking position where the travel direction (the fore and aft direction) of the vehicle is perpendicular to the passage.

The action plan unit 43 first performs an acquisition process (step ST21) to acquire an unparking space 71 (see FIG. 8A) from the external environment recognizing unit 41. More specifically, based on the signal from the external environment sensor 7, the external environment recognizing unit 41 detects the position and size of any obstacle around the own vehicle and also detects any space having a sufficient size for the own vehicle to move to on a front side, a left front side, and a right front side of the current position of the own vehicle. The action plan unit 43 acquires the information detected by the external environment recognizing unit 41. In a case where it is determined that there are sufficient spaces on the front side, the left front side, and the right front side of the current position, the action plan unit 43 sets an unparking space 71 on each of the left front side and the right front side of the current position. If it is determined that there are sufficient spaces on the front side and only one of the left front side and the right front side of the current position, the action plan unit 43 sets an unparking space 71 only on the one of the left front side and the right front side of the current position where there is a sufficient space. If it is determined that there is no sufficient space on either of the left front side and the right front side of the current position, the action plan unit 43 displays a message notifying the absence of the sufficient space on the touch panel 32, and terminates the automatic perpendicular unparking process.

Next, the action plan unit 43 performs a trajectory calculation process (ST22) to calculate a trajectory (a perpendicular unparking trajectory) for unparking the vehicle from the current position to each unparking space 71 based on the positions of other vehicles around the own vehicle acquired from the external environment recognizing unit 41. More specifically, the action plan unit 43 calculates a trajectory to lead the vehicle from the current position to each unparking space 71 by moving the vehicle only forward while steering the vehicle in the lateral direction (namely, while turning the vehicle to the left or right). In a case where the action plan unit 43 cannot calculate such a trajectory to lead the vehicle from the current position to each unparking space 71 by moving the vehicle only forward, the action plan unit 43 calculates a trajectory to move the vehicle forward and backward once or repeatedly. In the present embodiment, the action plan unit 43 calculates a trajectory to move the vehicle forward, backward, and forward in this order. More specifically, the action plan unit 43 calculates a trajectory to move the vehicle as follows. First, the vehicle moves forward to a prescribed front switching position, and then the steering angle of the wheels is changed thereat. Thereafter, the vehicle moves backward to a prescribed rear switching position, and then the steering angle of the wheels is changed thereat. Thereafter, the vehicle moves forward and then reaches the unparking space 71.

In a case where the trajectory of the vehicle for a certain unparking space 71 can be calculated, the action plan unit 43 sets the unparking space 71 as an unparking position candidate where the vehicle can be unparked, and make the touch panel 32 display the unparking position candidate on the screen (the unparking search screen). When the trajectory can be calculated for both of the unparking spaces 61 on the left and right sides of the front vehicle, the action plan unit 43 sets both of the unparking spaces 61 as unparking position candidates and make them displayed on the touch panel 32. If the trajectory from the current position to any unparking space 71 cannot be calculated due to the presence of the obstacle, the action plan unit 43 preferably displays a message notifying it on the touch panel 32 and terminates the automatic unparking process.

Next, the action plan unit 43 executes a target unparking position reception process (ST23) to receive a selection operation performed by the occupant to select the target unparking position, which is an unparking position where the occupant wants to unpark the vehicle, and is selected from the unparking position candidates displayed on the touch panel 32. More specifically, the action plan unit 43 causes the look-down image and the bird's-eye image in the travel direction to be displayed in the unparking search screen.

When the action plan unit 43 acquires at least one unparking position candidate, the action plan unit 43 displays an arrow indicating the direction of the trajectory to the unparking position candidate to be superimposed on the surrounding image in at least one of look-down image and the bird's-eye image. In the present embodiment, the action plan unit 43 causes an arrow indicating the direction of each trajectory to be displayed in both the look-down image and the bird's-eye image. In this way, the action plan unit 43 causes the touch panel 32 to display the direction of the trajectory to each unparking position candidate to be superimposed on the look-down image and the bird's-eye image in the unparking search screen, whereby the occupant can easily recognize the direction of the trajectory.

Also, the action plan unit 43 causes a notification instructing the driver to set the unparking position (target unparking position) to be displayed in the unparking search screen displayed on the touch panel 32 in order to receive the selection operation of the target unparking position. The selection operation of the target unparking position may be performed via the touch panel 32 or the selection input member 35.

After the target unparking position is selected by the driver, the action plan unit 43 switches the screen of the touch panel 32 from the unparking search screen to the unparking screen, and executes a driving process (ST24) to make the vehicle travel along the calculated trajectory. The action plan unit 43 preferably sets, as a condition for starting the driving process, at least one of an operation input corresponding to the start of driving, an operation of depressing the brake pedal 24, an operation of releasing the parking brake, and an operation of placing the shift lever 25 in a range suitable for the travel direction. In this case, the action plan unit 43 preferably makes a notification instructing the occupant to perform the operation set as the start condition by displaying it on the touch panel 32 or by voice guidance.

In the driving process, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 may control the powertrain 4, the brake device 5, and the steering device 6 so as to cause the vehicle to travel along the calculated trajectory.

Figure 8A:
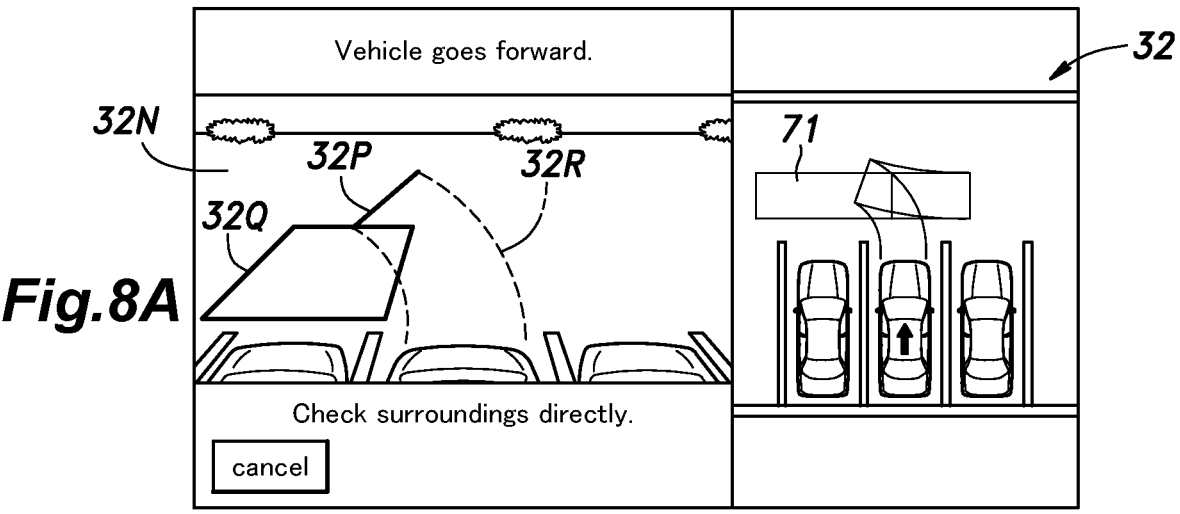
FIG. 8A is a diagram showing the screen display of the touch panel when the vehicle is moving forward in the automatic perpendicular unparking process.

As shown in FIG. 8A, when the vehicle is moving forward, namely, when the vehicle is traveling along the forward trajectory, the action plan unit 43 causes the left half of the touch panel 32 to superimpose an indicating line, a connecting part, and a target position frame on the front image. The indicating line indicates an ending position of the forward trajectory where the vehicle is traveling. The connecting part is included in the trajectory from the current position of the vehicle to the ending position of the forward trajectory, and connects the current position of the vehicle and the ending position of the forward trajectory. The target position frame indicates the target unparking position. In a case where the indicating line and the target position frame overlap with each other, the action plan unit 43 may cause the touch panel 32 to display both of them so as to overlap with each other or to display only one of them in a part where both of them overlap with each other.

More specifically, in the present embodiment, as shown in FIG. 8A, when the vehicle is moving forward from the starting position of the automatic perpendicular unparking process to the front switching position, the action plan unit 43 causes the left half of the touch panel 32 to superimpose an indicating line 32P (shown by a thick line), a connecting part 32R (shown by broken lines), and a target position frame 32Q (shown by a thick line) on the front image 32N. The indicating line 32P indicates the front switching position. The connecting part 32R is included in the trajectory from the current position of the vehicle to the front switching position, and connects the current position of the vehicle and the front switching position. The target position frame 32Q indicates the target unparking position. When the vehicle is moving forward from the rear switching position to the target unparking position, the action plan unit 43 causes the left half of the touch panel 32 to superimpose an indicating line, a connecting part, and a target position frame on the front image. The indicating line indicates the target unparking position. The connecting part is included in the trajectory from the current position of the vehicle to the target unparking position, and connects the current position of the vehicle and the target unparking position. The target position frame also indicates the target unparking position.

When the vehicle is moving backward, namely, when the vehicle is traveling along the backward trajectory, the action plan unit 43 causes the left half of the touch panel 32 to superimpose an indicating line and a connecting part on the rear image. The indicating line indicates an ending position of the backward trajectory where the vehicle is traveling. The connecting part is included in the trajectory from the current position of the vehicle to the ending position of the backward trajectory, and connects the current position of the vehicle and the ending position of the backward trajectory.

Figure 8B:
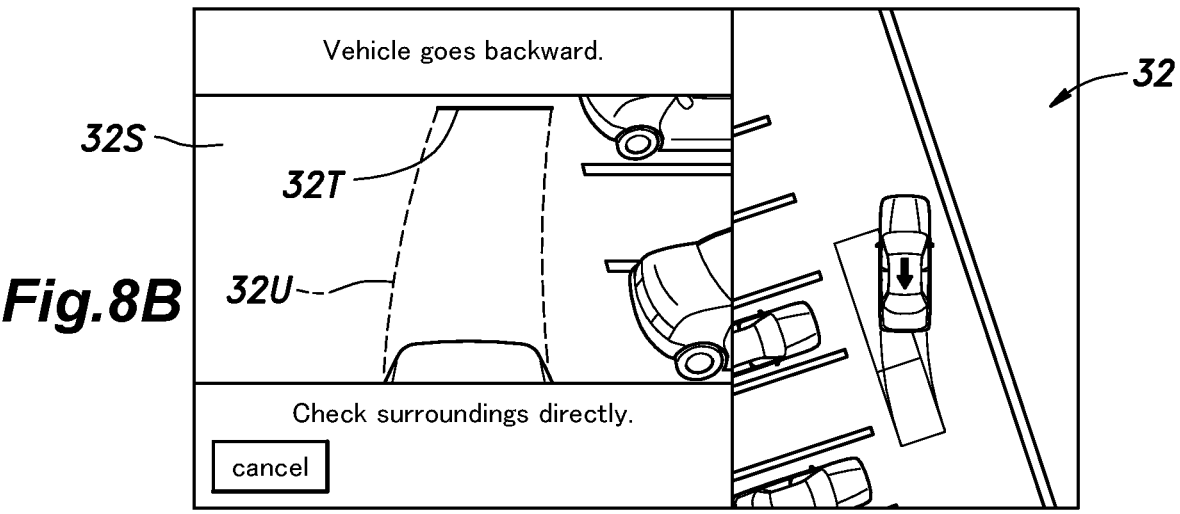
FIG. 8B is a diagram showing the screen display of the touch panel when the vehicle is moving backward in the automatic perpendicular unparking process.

More specifically, in the present embodiment, as shown in FIG. 8B, when the vehicle is moving backward from the front switching position to the rear switching position, the action plan unit 43 causes the left half of the touch panel 32 to superimpose an indicating line 32T (shown by a thick line) and a connecting part 32U (shown by broken lines) on the rear image 32S. The indicating line 32T indicates the rear switching position. The connecting part 32U is included in the trajectory from the current position of the vehicle to the rear switching position, and connects the current position of the vehicle and the rear switching position.

Further, during the driving process, in any of a case where the vehicle is moving forward, a case where the vehicle is moving backward, and a case where the vehicle is stopped, the action plan unit 43 causes the right half of the touch panel 32 to superimpose the current position of the vehicle and the trajectory from the current position of the vehicle to the target unparking position on the bird's-eye image. Further, the action plan unit 43 may cause the touch panel 32 to superimpose an arrow indicating the travel direction of the vehicle on an image of the own vehicle shown in the look-down image. Thereby, the target unparking position and the trajectory thereto are displayed to be easily recognized by the occupant, so that the occupant can confirm the travel direction and the trajectory on the screen and check the progress of the autonomous movement of the vehicle on the screen.

When the vehicle state determining unit 46 determines that the vehicle is in the prohibition state during the driving process, the action plan unit 43 displays a notification that the automatic unparking is suspended or canceled on the touch panel 32 and executes a deceleration process to decelerate the vehicle to stop the same. Thus, when there is a predetermined operation input by the occupant via the operation input member 11, the action plan unit 43 executes the deceleration process, whereby uneasiness that would be felt by the occupant if the movement of the vehicle were continued can be avoided.

When the vehicle reaches the target unparking position, the action plan unit 43 stops the vehicle and ends the driving process.

Next, the effect of the parking assist system 1 with the above configuration will be described. The parking assist system 1 is configured to execute the automatic parking process, the automatic parallel unparking process, and the automatic perpendicular unparking process. When the vehicle is moving autonomously, the occupant is expected to monitor the surroundings of the vehicle and to ensure the safety thereof.

As shown in FIGS. 4A, 4B, 6A, 6B, 8A, and 8B, when the vehicle is moving towards a switching position, the switching position and the connecting part (an example of a second part) are superimposed on the travel direction image (bird's-eye image) in the left half of the touch panel 32. The switching position is a position for steering the vehicle and changing a travel direction (moving direction) thereof. The connecting part is included in the trajectory from the current position of the vehicle to the switching position, and connects the current position of the vehicle and the switching position. At this time, the left half of the touch panel 32 hides a first part, which is included in the trajectory from the switching position to the target position, and connects the switching position and the target position. Thus, the display of the touch panel 32 can be simplified, so that the attention of the occupant can be concentrated on the trajectory to the switching position. Accordingly, the occupant can effectively monitor the surroundings of the vehicle, so that the safety of the vehicle can be enhanced.

It is important to monitor the surroundings of the vehicle in this way when the vehicle is traveling in an area where there is some risk of a collision or the like (for example, when the vehicle is moving forward towards the switching position in the automatic parallel unparking process).

As shown in FIG. 6A, when the vehicle is moving forward toward the switching position during the automatic parallel unparking process, the indicating line and the connecting part are superimposed on the travel direction image (front image) in the left half of the touch panel 32. The indicating line indicates the switching position. The connecting part is included in the trajectory from the current position of the vehicle to the switching position, and connects the current position of the vehicle and the switching position. On the other hand, as shown in FIG. 4B, when the vehicle is moving backward toward the switching position in the automatic parking process, the indicating line, the connecting part, and the target position frame are superimposed on the travel direction image (rear image) in the left half of the touch panel 32. The indicating line indicates the switching position. The connecting part is included in the trajectory from the current position of the vehicle to the switching position, and connects the current position of the vehicle and the switching position. The target position frame indicates the target parking position.

In this way, when the vehicle is moving forward towards the switching position during the automatic parallel unparking process, the action plan unit 43 causes the left half of the touch panel 32 to display the indicating line and to stop displaying the target position frame. Thus, in the parking assistance, the action plan unit 43 can switch the display/non-display of the target position frame indicating the target position (the target unparking position or the target parking position) according to the travel condition of the vehicle. A non-display condition for stopping the display of the target position frame (for hiding the target position frame) includes a condition that the vehicle moves forward in the automatic parallel unparking process for unparking the vehicle parked by parallel parking. In this way, the display of the target unparking position is stopped when the vehicle parked by parallel parking moves forward to be unparked. Accordingly, the attention of the occupant can be concentrated on the trajectory of the vehicle from the current position to the switching position (stop position), so that the safety of the vehicle can be enhanced.

As shown in FIG. 4B, a display condition for displaying the target position frame includes a first condition that the vehicle moves backward in the automatic parking process. In this way, the target parking position (the target position) is displayed when the vehicle is moving backward in the automatic parking process, so that the occupant can easily recognize the position where the automatic parking process is completed and the vehicle is stopped. Accordingly, the anxiety of the occupant caused by the autonomous movement of the vehicle can be reduced.

As shown in FIG. 8A, the display condition for displaying the target position frame includes a second condition that the vehicle moves forward in the automatic perpendicular unparking process. In this way, the target unparking position (the target position) is displayed when the vehicle is moving forward in the automatic perpendicular unparking process. Accordingly, the occupant can easily understand the unparking direction of the vehicle, so that the anxiety of the occupant caused by the autonomous movement of the vehicle can be reduced.

Concrete embodiments of the present invention have been described in the foregoing, but the present invention should not be limited by the foregoing embodiments and various modifications and alterations are possible within the scope of the present invention. For example, a position and/or a range of the image displayed on the screen may be appropriately changed within the scope of the present invention. Also, the concrete structure, arrangement, number, process content and procedure, etc. of the components/units of the embodiments may be appropriately changed within the scope of the present invention. Also, not all of the structural elements shown in the above embodiments are necessarily indispensable and they may be selectively adopted as appropriate.

In the above embodiment, the trajectory displayed on the left half of the touch panel 32 is changed based only on a mode for unparking the vehicle. However, the present invention is not limited to this embodiment. For example, the action plan unit 43 may evaluate the danger of the area where the vehicle is traveling based on the type of road where the vehicle is traveling, and may stop displaying the target position (the target parking position or the target unparking position) on determining that the above danger is higher than a prescribed reference value.

In the above embodiment, the target position is displayed by the target position frame, and the switching position is displayed by the indicating line. However, the present invention is not limited to this embodiment. For example, both the target position and the switching position may be displayed by frames or prescribed icons in the touch panel 32. Further, the trajectory displayed on the touch panel 32 may be a trajectory of the wheels, or may be a line, an arrow, a band, or the like that indicates the movement of the center (for example, the center of gravity) of the vehicle.

In the above embodiment, the target position is hidden when the vehicle moves forward during the automatic parallel unparking process, displayed when the vehicle moves forward during the automatic perpendicular unparking process, and displayed when the vehicle moves backward during the automatic parking process. However, the present invention is not limited to this embodiment as long as the first part (namely, the part included in the trajectory from the switching position to the target position and connecting the switching position and the target position) is hidden. For example, in a case where a prescribed condition is satisfied when the vehicle moves forward during the automatic perpendicular unparking process, the target position may be hidden. Further, in a case where a prescribed condition is satisfied when the vehicle moves backward during the automatic parking process, the target position may be hidden. Accordingly, the attention of the occupant can be concentrated on the trajectory to the switching position not only during the automatic parallel unparking process but also during the automatic perpendicular unparking process and during the automatic parking process.

In the above embodiment, the target position is displayed when the vehicle moves forward in the automatic perpendicular unparking process and when the vehicle moves backward in the automatic parking process. However, the present invention is not limited to this embodiment. For example, the target position may be displayed when the vehicle moves forward in the automatic perpendicular unparking process or when the vehicle moves backward in the automatic parking process. Further, the target position may be displayed in a case where a prescribed condition is satisfied when the vehicle moves forward in the automatic parallel unparking process.

In the above embodiment, the display/non-display of the target position is switched regardless of whether the switching position and the target position can be simultaneously displayed in the left half of the touch panel 32. However, the present invention is not limited to this embodiment. For example, when the switching position and the target position can be simultaneously displayed in the left half of the touch panel 32 and a prescribed non-display condition is satisfied during the automatic parallel unparking process, the action plan unit 43 may hide the target position. At this time, the display/non-display of a part connecting the starting point and the ending point of the trajectory displayed on the left half of the touch panel 32 may be switched as appropriate.

The invention claimed is:

1. A parking assist system configured to autonomously move a vehicle from a current position to a target position, the parking assist system comprising:
an imaging device configured to capture an image of a surrounding of the vehicle;
a display device configured to display a surrounding image of the vehicle based on the image captured by the imaging device; and
a control device configured to control a display of the display device based on the surrounding image and to calculate a trajectory of the vehicle from the current position to the target position,
wherein during a perpendicular parking process, in a case where the trajectory includes a switching position for steering the vehicle and changing a moving direction thereof and the vehicle is moving toward the switching position, the control device causes the display device to superimpose the switching position and the target position on the surrounding image, and
during a parallel unparking process, in a case where the trajectory includes the switching position for steering the vehicle and changing a moving direction thereof and the vehicle parked between two vehicles aligned in a fore and aft direction of the vehicle is moving forward toward the switching position, the control device causes the display device to hide the target position even when the switching position and the target position can be simultaneously displayed on the display device.

2. The parking assist system according to claim 1, wherein in the case where the trajectory includes the switching position and the vehicle is moving toward the switching position, the control device causes the display device to superimpose the switching position and a part connecting a starting point and an ending point of the trajectory on the surrounding image, and then causes the display device to further superimpose the target position on the surrounding image when a prescribed display condition is satisfied.

3. The parking assist system according to claim 2, wherein the display condition includes at least one of a first condition and a second condition, the first condition being a condition that the vehicle moves backward so as to be parked, the second condition being a condition that the vehicle parked between two vehicles aligned in a lateral direction of the vehicle moves forward so as to be unparked.

* * * * *